US009173131B2

(12) United States Patent
Liu et al.

(10) Patent No.: US 9,173,131 B2
(45) Date of Patent: Oct. 27, 2015

(54) MOBILITY LOAD BALANCE PROCESSING METHOD, RELAY NODE, DONOR BASE STATION, AND COMMUNICATION SYSTEM

(71) Applicant: HUAWEI TECHNOLOGIES CO., LTD., Shenzhen (CN)

(72) Inventors: Jing Liu, Shanghai (CN); Yan Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 14/162,199

(22) Filed: Jan. 23, 2014

(65) Prior Publication Data

US 2014/0135015 A1 May 15, 2014

Related U.S. Application Data

(63) Continuation of application No. PCT/CN2012/079229, filed on Jul. 27, 2012.

(30) Foreign Application Priority Data

Jul. 27, 2011 (CN) .......................... 2011 1 0212007

(51) Int. Cl.
H04W 36/00 (2009.01)
H04W 28/08 (2009.01)
(Continued)

(52) U.S. Cl.
CPC .............. *H04W 28/08* (2013.01); *H04W 24/02* (2013.01); *H04W 36/22* (2013.01); *H04B 7/15542* (2013.01); *H04B 7/2606* (2013.01); *H04W 72/0446* (2013.01); *H04W 84/047* (2013.01)

(58) Field of Classification Search
CPC .. H04W 36/22; H04W 36/0083; H04W 28/08
See application file for complete search history.

(56) References Cited

U.S. PATENT DOCUMENTS

2006/0209688 A1 9/2006 Tsuge et al.
2010/0124933 A1* 5/2010 Chowdhury et al. ......... 455/453
(Continued)

FOREIGN PATENT DOCUMENTS

CN 101415207 A 4/2009
EP 2306766 4/2011
(Continued)

OTHER PUBLICATIONS

Extended European Search Report dated Jun. 20, 2014 in corresponding European Patent Application No. 12817544.5.
(Continued)

*Primary Examiner* — Khalid Shaheed
(74) *Attorney, Agent, or Firm* — Staas & Halsey LLP

(57) ABSTRACT

A mobility load balance processing method includes: sending, by a donor base station DBS, indication information to a relay node RN of the donor base station DBS, where the donor base station DBS uses the indication information to instruct the relay node RN to perform mobility load balance processing to hand over at least one user equipment UE in a cell of the relay node RN to a neighboring cell. A relay node, a donor base station, and a communication apparatus are also disclosed. Through UE handover, a cell to which a UE is attached can be adjusted, so that load balance between cells is achieved after an RN is introduced. In this way, network resource utilization is maximized, and system capacity and system performance are improved.

10 Claims, 6 Drawing Sheets

(51) Int. Cl.
*H04W 36/22* (2009.01)
*H04W 24/02* (2009.01)
*H04W 72/04* (2009.01)
*H04B 7/155* (2006.01)
*H04B 7/26* (2006.01)
*H04W 84/04* (2009.01)

(56) References Cited

U.S. PATENT DOCUMENTS

| | | | |
|---|---|---|---|
| 2011/0014922 A1* | 1/2011 | Jen | 455/450 |
| 2011/0053598 A1* | 3/2011 | Ahluwalia | 455/436 |
| 2011/0235514 A1* | 9/2011 | Huang et al. | 370/235 |
| 2012/0087298 A1* | 4/2012 | Garavaglia et al. | 370/315 |
| 2012/0314569 A1* | 12/2012 | Liu et al. | 370/230 |

FOREIGN PATENT DOCUMENTS

| | | |
|---|---|---|
| EP | 2306767 | 4/2011 |
| WO | 2009/030114 A1 | 3/2009 |
| WO | 2010/121661 A1 | 10/2010 |

OTHER PUBLICATIONS

R3-091335, "Additional consideration for Type 1 Relay," *3GPP TSG RAN WG3 Meeting* #64, May 4-8, 2009, pp. 1-3, Agenda Item 13.1, Huawei, San Francisco, USA. English.

International Search Report issued Nov. 15, 2012, in corresponding International Patent Application No. PCT/CN2012/079229.

International Search Report Issued on Nov. 15, 2012 in corresponding International Application No. PCT/CN2012/079229.

* cited by examiner

US 9,173,131 B2

MOBILITY LOAD BALANCE PROCESSING METHOD, RELAY NODE, DONOR BASE STATION, AND COMMUNICATION SYSTEM

CROSS-REFERENCE TO RELATED APPLICATIONS

This application is a continuation of International Application No. PCT/CN2012/079229, filed on Jul. 27, 2012, which claims priority to Chinese Patent Application No. 201110212007.6, filed on Jul. 27, 2011, both of which are hereby incorporated by reference in their entireties.

TECHNICAL FIELD

The present invention relates to communication technologies, and in particular, to a mobility load balance processing technology.

BACKGROUND

In a conventional network, a direct wireless connection exists between a base station (base station, BS for short) and a user equipment (user equipment, UE for short). With the development of communication technologies, a relay technology is introduced. That is to say, one or more relay nodes (relay node, RN for short) are added between the BS and the UE. The RN is responsible for forwarding a radio signal sent by the BS, where the signal is forwarded one or more times, and finally arrives at the UE. For example, one RN may divide a radio link between a BS and a UE into two radio links: a link from the BS to the RN, and a link from the RN to the UE. In this way, a low-quality link can be replaced with two high-quality links to achieve higher link capacity and better coverage.

Taking the LTE technology as an example, BSs may be interconnected through an X2 interface. After the RN is introduced, an S1/X2 interface exists between the RN and its donor base station (Donor BS, DBS for short). Therefore, the DBS will provide an S1/X2 interface proxy (proxy) function between the RN and other network nodes. For example, the DBS provides an S1 interface proxy function between the RN and a mobility management entity (mobility management entity, MME for short), and also provides an S1 interface proxy (proxy) function between the RN and a serving gateway (serving gateway, SGW for short), and provides an X2 interface proxy function between the RN and the BS. In other words, information transferred between the RN and the BS needs to be processed and forwarded by the DBS. After the RN is introduced, the DBS may serve the UE; and the RN controlled by the DBS may also serve as a base station to serve the UE.

In the prior art, when a UE moves, due to randomness of the UE location and diversity of services, a cell may be excessively loaded or even congested while the load of a neighboring cell of the cell may be very light. The signal coverage of the cell intersects the signal coverage of its neighboring cell. For example, if overlapped signal coverage exists between two cells, the two cells are in a neighbor relationship with each other and are neighboring cells of each other. Similarly, if more than one base station serves the neighboring cell, the more than one base station may be called neighboring base stations of each other.

A feasible means of relieving the heavy load of the cell is negotiation between cells, for example, negotiation between a cell and its neighboring cell. For example, an excessively loaded cell requests a lightly-loaded neighboring cell to share the load generated by some UEs, that is, UEs at the edge of the excessively loaded cell are handed over to the lightly-loaded neighboring cell to achieve load balance between cells, maximize network resource utilization, and improve system capacity and system performance.

However, up to now, no effective method is available to solve the issue of mobility load balance between cells after an RN is introduced.

SUMMARY

The present invention provides a mobility load balance processing method, a relay node, a donor base station, and a communication system to solve the issue of mobility load balance between cells after an RN is introduced.

To solve the above technical issue, in one aspect, the present invention provides a mobility load balance processing method, including:

sending, by a donor base station DBS, indication information to a relay node RN of the donor base station DBS, where the donor base station DBS uses the indication information to instruct the relay node RN to perform mobility load balance processing to hand over at least one user equipment UE in a cell of the relay node RN to a neighboring cell.

In another aspect, the present invention provides a mobility load balance processing method, including:

receiving, by a relay node RN, indication information sent by a donor base station DBS that serves the relay node RN; and triggering, by the relay node RN, mobility load balance processing according to the indication information to hand over at least one user equipment UE in a cell of the relay node RN to a neighboring cell.

In another aspect, the present invention provides a donor base station, including:

a detecting unit, configured to detect whether a transport network layer resource of an S1 interface between the donor base station DBS and a relay node RN of the donor base station DBS exceeds a first mobility load balance trigger threshold, or detect whether a hardware resource of the donor base station DBS exceeds a second mobility load balance trigger threshold, or detect whether a transport network layer resource of an S1 interface between the donor base station DBS and a serving gateway SGW exceeds a third mobility load balance trigger threshold, or detect whether a radio resource load of a cell of the donor base station DBS exceeds a fourth mobility load balance trigger threshold; and a first processing unit, configured to send indication information to the relay node RN to hand over at least one user equipment UE in a cell of the relay node RN to a neighboring cell.

In still another aspect, the present invention provides a relay node, including:

a receiving unit, configured to receive indication information sent by a donor base station DBS that serves the relay node RN; and a processing unit, configured to perform mobility load balance processing according to the indication information to hand over at least one user equipment UE in a cell of the relay node RN to a neighboring cell.

In still another aspect, the present invention provides a communication system, including:

a relay node RN, and a donor base station DBS that serves the relay node RN, where the donor base station DBS is configured to send indication information to the relay node RN; and the relay node RN is configured to perform mobility load balance processing according to the indication information to hand over at least one user equipment UE in a cell of the relay node RN to a neighboring cell.

As can be seen from the above, through UE handover, the present invention adjusts a cell to which a UE is attached, so that load balance between cells is achieved after an RN is introduced. In this way, network resource utilization is maximized, and system capacity and system performance are improved.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

It is understandable to persons skilled in the art that an accompanying drawing is only a schematic diagram of an exemplary embodiment, and the modules or processes in the accompanying drawing are not necessarily required for implementing the present invention.

Figure 1:
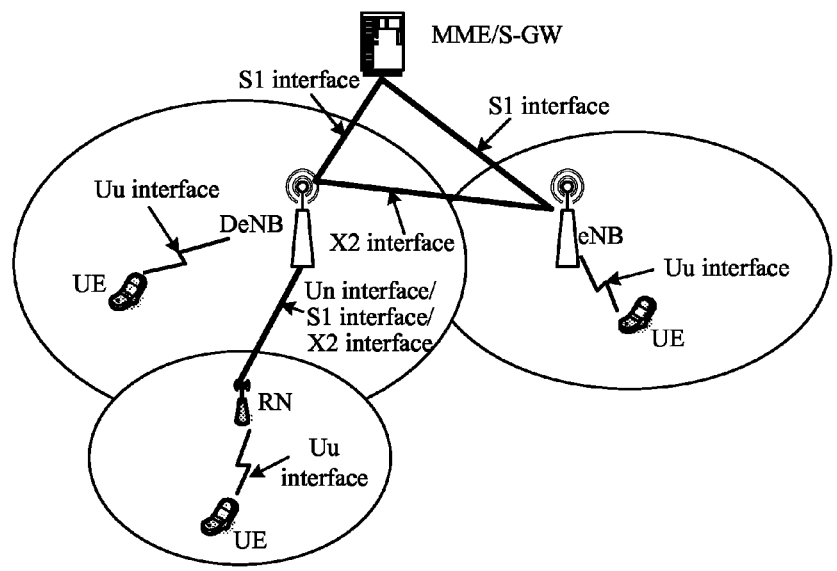
FIG. 1 is a network architecture diagram according to an embodiment of the present invention.

A communication system suitable for applying different embodiments of the present invention includes at least one first RN, at least one first DBS serving the first RN, and at least one base station or relay station. The base station may be a second DBS, or a BS; and the relay station may be a second RN. For example, a communication system shown in FIG. 1 and suitable for applying different embodiments of the present invention includes one RN, one DBS serving the RN, and one BS. The scenario shown in FIG. 1 is cited in all the following descriptions of different embodiments. Persons skilled in the art may understand that, when a BS sends information to a DBS, the BS may be called a source base station; when a BS receives information sent by a DBS, the BS may be called a target base station. Moreover, in other communication systems (not illustrated), a communication system suitable for applying different embodiments of the present invention may include at least one first RN, at least one first DBS serving the first RN, and at least one second DBS; or, the communication system may include at least one first RN, at least one first DBS serving the first RN, and at least one second RN, and no repeated description is given here any further.

In different embodiments of the present invention, the RN is located of the DBS, and the RN is controlled by the DBS. The DBS and the BS respectively serve one or more cells. Persons skilled in the art may understand that, the DBS may be a macro base station or a micro base station; the BS may be a macro base station or a micro base station; however the embodiments of the present invention are not limited thereto.

In different embodiments of the present invention, a cell located of a DBS and a cell located of a BS may be called a neighboring cell of each other, and a cell located of an RN and a cell located of a BS may also be called a neighboring cell of each other. Persons skilled in the art may understand that, in other communication systems (not illustrated), for example, when the above-mentioned communication system includes at least one first RN, at least one first DBS serving the first RN, and at least one second DBS, a cell located of the first DBS and a cell located of the second DBS may be called a neighboring cell of each other, and a cell located of the first RN and a cell located of the second DBS may also be called a neighboring cell of each other. Alternatively, when the above-mentioned communication system includes at least one first RN, at least one first DBS serving the first RN, and at least one second RN, a cell located of the first DBS and a cell located of the second RN may be called a neighboring cell of each other, and a cell located of the first RN and a cell located of the second RN may also be called a neighboring cell of each other, and no repeated description is given here any further.

As shown in FIG. 1, an interface between the DBS and the UE, an interface between the BS and the UE, and an interface between the RN and the UE are all Uu interfaces (hereinafter referred to as air interfaces). The Uu interfaces are mainly used to transfer control-plane signaling and user-plane data. A communication connection may also be created between the RN and the DBS through an air interface. For example, a communication connection may be created between the RN and the DBS through a radio resource control layer (Radio Resource Control, RRC for short) of a protocol stack on an RN side and a DBS side. An S1 interface between the DBS and the RN is mainly used to transfer S1 control signaling and relay link (backhaul) data. Persons skilled in the art may understand that, the relay link is used for communication between the DBS and the RN. An S1 interface between the DBS and an SGW is mainly used to transfer user-plane data. An S1 interface between the DBS and an MME is mainly used to transfer S1 control signaling. An X2 interface between the DBS and the RN, and between the DBS and the BS, is mainly used to transfer X2 control signaling.

In the embodiments of the present invention, the DBS is responsible for allocating relay link resources between the RN and the DBS, and transferring relay link data through an S1 interface created between the RN and the DBS. For the DBS, its air interface resources are preferably used to transfer relay link data or S1/X2 control signaling, and then used to provide coverage. For example, the DBS first ensures transfer of data or control signaling between the DBS and the RN first, and then enables transfer of data or control signaling between the DBS and the UE. In other words, transmission resources between the RN and the DBS are dynamically allocated and adjusted by the DBS. Persons skilled in the art may understand that, the DBS may dynamically adjust or allocate the transmission resources between the RN and the DBS according to the amount of data transferred to the UE of the RN in the coverage of the RN. For example, when the amount of data transferred to the UE of the RN in the coverage of the RN is large, the DBS allocates more transmission resources to a relay link between the RN and the DBS to transmit data of the UE, and no repeated description is given here any further.

In the embodiments of the present invention, when a cell of the DBS is excessively loaded, the DBS may notify the RN to hand over UEs at the edge of the cell of the RN to a lightly-loaded cell of the BS. When a cell of the BS is excessively loaded, UEs of the cell and at the edge of the cell may also be handed over to a lightly-loaded cell of the RN, so as to achieve load balance between the cell of the DBS and the cell of the BS, and between the cell of the BS and the cell of the RN. In this way, network resource utilization is maximized, and system capacity and system performance are improved.

Specific embodiments are described in detail in the following with reference to accompanying drawings.

Figure 2:
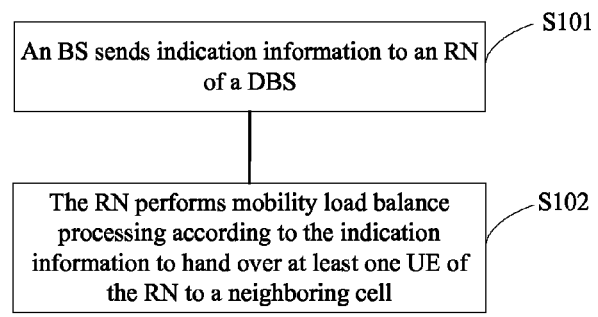
FIG. 2 is a flowchart of a mobility load balance processing method according to a first embodiment of the present invention.

As shown in FIG. 2, a communication method provided in a first embodiment of the present invention includes the following steps:

S101. A DBS sends indication information to an RN of the DBS.

S102. The RN performs mobility load balance processing according to the indication information to hand over at least one UE of the RN to a neighboring cell.

In S101, when at least one of the following conditions is fulfilled, the DBS will be triggered to send the indication information to the RN:

The DBS detects that a transport network layer resource of an S1 interface between the DBS and the RN exceeds a first mobility load balance trigger threshold. For example, the transport network layer resource of the S1 interface between the DBS and the RN is excessively loaded; or, the transport network layer resource of the S1 interface between the DBS and the RN is heavily loaded or overloaded; or, it may be determined according to a preset value whether the transport network layer resource of the S1 interface between the DBS and the RN exceeds the first mobility load balance trigger threshold.

Alternatively, the DBS detects that hardware resource thereof exceeds a second mobility load balance trigger threshold. For example, the hardware resource of the DBS is excessively loaded; or, the hardware resource of the DBS is heavily loaded or overloaded; or, it may be determined according to a preset value whether the hardware resource of the DBS exceeds the second mobility load balance trigger threshold.

Alternatively, the DBS detects that a transport network layer resource of an S1 interface between the DBS and an SGW exceeds a third mobility load balance trigger threshold. For example, the transport network layer resource of the S1 interface between the DBS and the SGW is excessively loaded; or, the transport network layer resource of the S1 interface between the DBS and the SGW is heavily loaded or overloaded; or, it may be determined according to a preset value whether the transport network layer resource of the S1 interface between the DBS and the SGW exceeds the third mobility load balance trigger threshold.

Alternatively, the DBS detects that its radio resource load exceeds a fourth mobility load balance trigger threshold. For example, the radio resource of the DBS is excessively loaded; or, the radio resource of the DBS is heavily loaded or overloaded; or, it may be determined according to a preset value whether the radio resource load of the DBS exceeds the fourth mobility load balance trigger threshold. The radio resource load of the DBS may be obtained according to usage of a physical resource block (Physical Resource Block, PRB for short) of the DBS that is occupied by both the UE and the RN.

In this embodiment, the first to fourth mobility load balance trigger thresholds may be values determined in a preset manner. Persons skilled in the art may understand that, such mobility load balance trigger thresholds may also be determined in other manners, and no repeated description is given here any further.

The indication information is used to instruct the RN to trigger mobility load balance processing. For example, after the RN receives the indication information sent by the DBS, the RN is triggered to send a resource status request (Resource Status Request) message to the BS, and determines a target cell according to load status information of each cell of the BS that is reported by the BS. Subsequently, the RN instructs a UE at the edge of the cell to hand over to the target cell, thereby achieving load balance between a cell of the DBS and the cell of the BS. In different embodiments of the present invention, the target cell refers to a cell where the UE is located after the handover is complete. For example, the target cell may be a lightly-loaded cell of the BS. Persons skilled in the art may understand that, the edge of the cell may be obtained in a preset manner, and, when the RN hands over the UE at the edge of the cell to the target cell, the RN may hand over at least one UE in the cell of the RN to the target cell, and no repeated description is given here any further.

In this embodiment, a new parameter may be added in an existing message to carry the indication information, or a new message may be defined to carry the indication information, and no repeated description is given here any further.

Because the DBS is responsible for allocating and adjusting relay link resources between the RN and the DBS, the RN fails to obtain resource load information of a transport network layer of the S1 interface between the RN and the DBS accurately and in time. If multiple RNs are deployed in the coverage of the DBS, most transmission resources of the DBS are used for backhaul of a relay link between the DBS and the RN. Consequently, few UEs are directly attached to the DBS. Once a mobility load balance process is triggered because of an excessive resource load of a cell of the DBS, the DBS hands over the UE at the edge of the cell to a cell of the BS (which may be understood as a target cell) to relieve the excessive resource load of the cell of the DBS. However, when few UEs are located at the edge of the cell of the DBS, even if the DBS hands over all UEs to the target cell, its resource load may be hardly relieved.

In this embodiment, the RN triggers mobility load balance processing according to the indication information sent by the DBS, so as to hand over the UE at the edge of the cell of the RN to the cell of the BS. With decrease of the number of UEs in the coverage of the RN, fewer transmission resources are occupied by the relay link between the RN and the DBS, thereby further relieving the resource load of the DBS and achieving load balance between the cell of the DBS and the cell of the BS.

Figure 3:
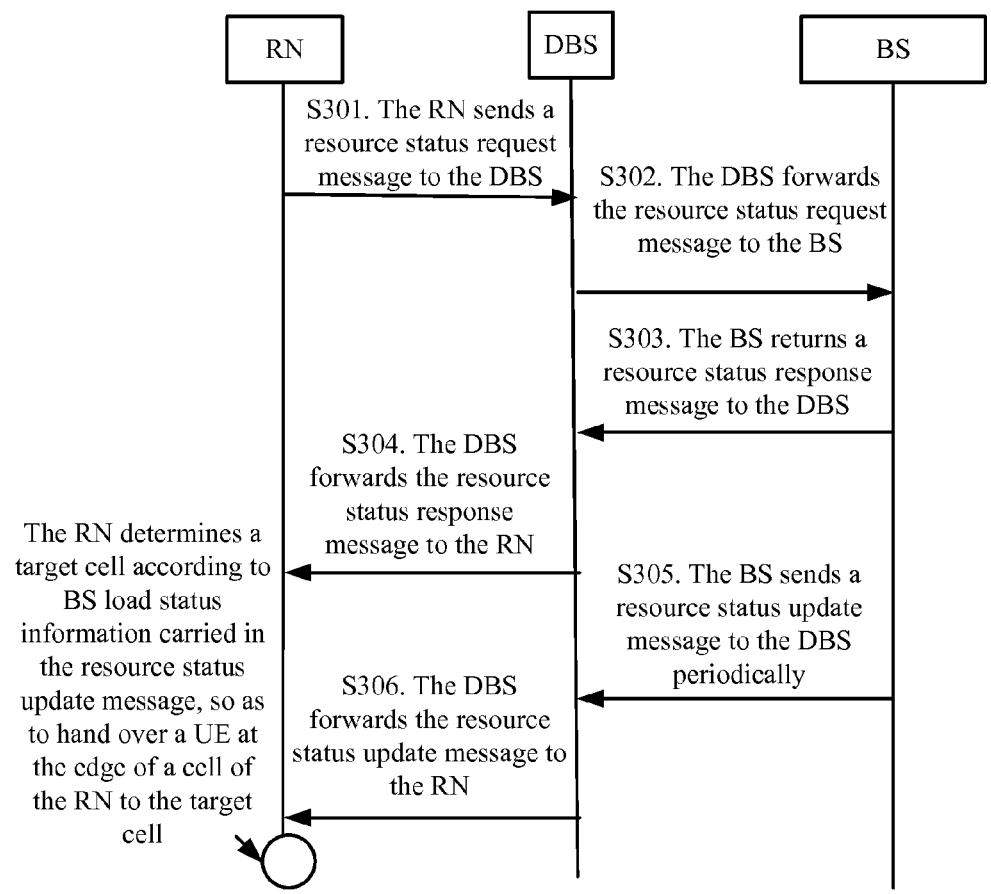
FIG. 3 is a flowchart of triggering mobility load balance processing according to a first embodiment of the present invention.

Further, in S102, as shown in FIG. 3, the RN triggers mobility load balance processing according to the indication information sent by the DBS. In this embodiment, the neighboring cell is a cell of the BS.

The triggering mobility load balance processing includes the following steps:

S301. An RN sends a resource status request message to a DBS.

S302. The DBS forwards the resource status request message to a BS.

S303. The BS returns a resource status response message to the DBS.

S304. The DBS forwards the resource status response message to the RN.

S305. The BS sends a resource status update message to the DBS periodically.

S306. The DBS forwards the resource status update message to the RN.

S307. The RN determines a target cell according to BS load status information carried in the resource status update message, so as to hand over a UE at the edge of a cell of the RN to the target cell.

In S301 and S302, the resource status request message carries a cell identifier of a cell whose load status information needs to be reported. In this embodiment, the cell identifier is a cell identifier of a cell of the BS. For example, the cell identifier may be an evolved cell global identifier (Evolved Cell Global Identifier, ECGI for short).

In S305, the load status information may include at least one of the following pieces of load status information: radio resource load status information of the cell of the BS, hardware load status information of the BS, and resource load status information of a transport network layer of an S1 interface of the BS. For example, the radio resource load status information of the cell of the BS may be obtained according to usage of BS physical resource blocks occupied by the UE, and a radio resource load status of the cell of the BS may be determined through a measurement mechanism at L2 of a protocol stack on a BS side. For another example, the hardware load status information of the BS may be usage of hardware in the BS, such as CPU usage of the BS, or free space of a BS buffer, and a hardware load status of the BS may be determined through a hardware module. For still another example, the resource load status information of the transport network layer of the S1 interface of the BS may be usage of a bandwidth at the S1 interface, and a resource load status of the transport network layer of the S1 interface of the BS may be determined through a transmission resource management module. Specifically, the determining the resource load status information of the transport network layer of the S1 interface of the BS may include the following steps: The BS obtains transmission bandwidth configuration of the S1 interface through the transmission resource management module; and the BS determines a data packet loss ratio at the S1 interface through a performance management and measurement technique at an IP layer of the protocol stack on the BS side. For example, according to packets sent by the BS on an uplink and packets received by an SGW, a packet loss ratio of uplink data of the S1 interface can be determined For another example, according to packets sent by the SGW in a downlink and packets received by the BS, a packet loss ratio of downlink data of the S1 interface may be determined. Finally, according to the obtained information, the BS can use a preset algorithm to obtain the resource load status of the transport network layer of the S1 interface.

In S305, after receiving an indication of requesting specified load status information in the resource status request message, the BS obtains corresponding load status information, such as radio resource load status information of the cell of the BS, or hardware load status information of the BS, or resource load status information of the transport network layer of the S1 interface of the BS.

In S306, the BS carries the obtained load status information in the resource status update message, and reports it to the RN periodically through the DBS. For example, when the resource status request message carries an indication of requesting the radio resource load status information of the cell of the BS, the resource status update message sent by the BS to the RN bears the radio resource load status information of the cell of the BS. For another example, when the resource status request message carries a request for the radio resource load status information of the cell of the BS but the BS fails to obtain the radio resource load status information of the cell, the BS sends a resource status failure message to the RN.

In S307, the RN determines the target cell according to the resource status update message reported by the BS, so as to hand over the UE at the edge of the cell of the RN to the target cell. For example, the RN may, by adjusting a cell offset (CellIndOffset, CIO for short), make it easier to trigger a measurement report event of the UE at the edge of the cell of the RN and quicken the handover of the UE to the target cell. Persons skilled in the art may understand that, the UE of the RN may be handed over to the target cell in other manners, and no repeated description is given here any further.

Therefore, in this embodiment, the UE located at the edge of the cell of the RN may be handed over to the cell of the BS according to a load status of the cell of the DBS, so as to achieve load balance between the cell of the DBS and the cell of the BS, In this way, network resource utilization is maximized, and system capacity and system performance are improved.

Figure 4:
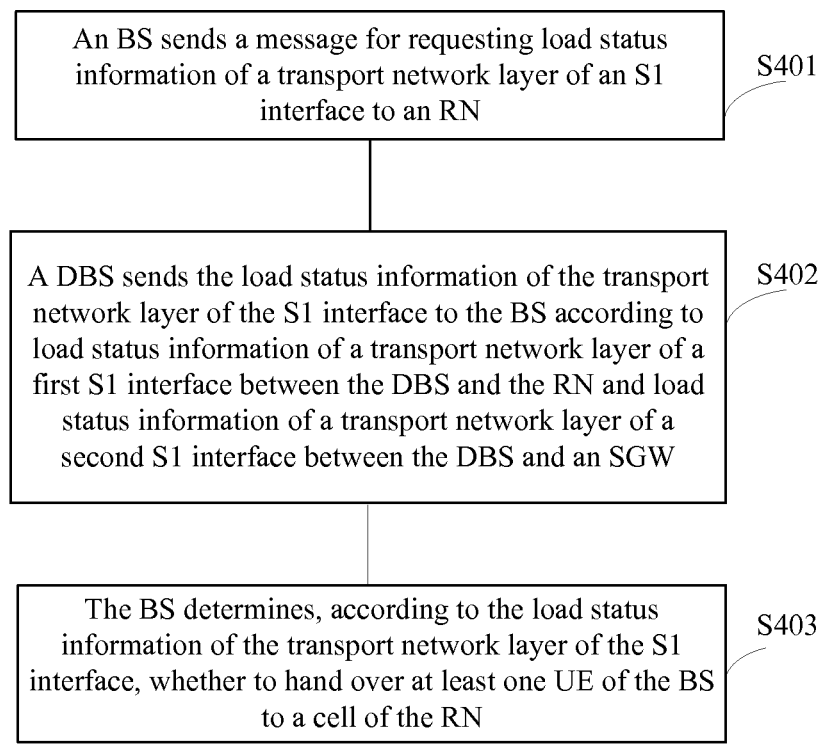
FIG. 4 is a flowchart of a mobility load balance processing method according to a second embodiment of the present invention.

As shown in FIG. 4, a communication method provided in a second embodiment of the present invention includes the following steps:

S401. A BS sends a message for requesting load status information of a transport network layer of an S1 interface to an RN.

S402. A DBS sends the load status information of the transport network layer of the S1 interface to the BS according to load status information of a transport network layer of a first S1 interface between the DBS and the RN and according to load status information of a transport network layer of a second S1 interface between the DBS and an SGW.

S403. According to the load status information of the transport network layer of the S1 interface, the BS determines whether to hand over at least one UE of the BS to a cell of the RN.

In S401, when BS resources are excessively loaded, for example, heavy load or overload occurs, the BS may send a message for requesting the load status information of the transport network layer of the S1 interface to the RN through the DBS. In this embodiment, the BS sends a message for requesting a resource status, such as a resource status request message to the RN through the DBS. After receiving the resource status request message, the RN reports corresponding load status information according to an indication of requesting load status information carried in the resource status request message. The load status information may be at least one of the following pieces of load status information:

radio resource load status information of the cell of the RN, or hardware load status information of the RN, or load status information of a transport network layer of an S1 interface of the RN. Persons skilled in the art may understand that, for the manner of obtaining the radio resource load status information of the cell of the RN or the hardware load status information of the RN, reference may be made to the manner of obtaining the radio resource load status information of the cell of the BS or the hardware load status information of the BS according to the first embodiment, and no repeated description is given here any further.

In S402, the load status information of the transport network layer of the S1 interface may be carried in a resource status update message of the RN and reported to the BS, and for example, reference may be made to relevant descriptions in the first embodiment, and no repeated description is given here any further. This embodiment differs from the first embodiment in that: In this embodiment, the load status information of the transport network layer of the S1 interface that is reported from the DBS to the BS is obtained by taking the following into account: the load status information of the transport network layer of the first S1 interface between the DBS and the RN, and the load status information of the transport network layer of the second S1 interface between the DBS and the SGW. For lack of an interface connection between the RN and the SGW, the RN fails to directly obtain the load status information of the transport network layer of the S1 interface between the DBS and the SGW (hereinafter referred to as the load status information of the transport network layer of the second S1 interface). For the DBS, because an interface connection exists between the DBS and the SGW, the DBS can obtain the load status information of the transport network layer of the second S1 interface. Meanwhile, because the DBS dynamically allocates transmission resources between the DBS and the RN, the DBS may also obtain the load status information of the transport network layer of the S1 interface between the DBS and the RN (hereinafter referred to as the load status information of the transport network layer of the first S1 interface).

Specifically, S402 further includes:

when a transport network layer load value carried in the load status information of the transport network layer of the first S1 interface exceeds a transport network layer load value carried in the load status information of the transport network layer of the second S1 interface, sending, by the DBS, the load status information of the transport network layer of the first S1 interface to the BS; or when a transport network layer load value carried in the load status information of the transport network layer of the first S1 interface is lower than a transport network layer load value carried in the load status information of the transport network layer of the second S1 interface, sending, by the DBS, the load status information of the transport network layer of the second S1 interface to the BS; or when a transport network layer load value carried in the load status information of the transport network layer of the first S1 interface is equal to a transport network layer load value carried in the load status information of the transport network layer of the second S1 interface, sending, by the DBS, the load status information of the transport network layer of the first S1 interface or the load status information of the transport network layer of the second S1 interface to the BS.

For example, when a transport network layer load of the S1 interface between the RN and the DBS is on a medium level but a transport network layer load of the S1 interface between the DBS and the S-GW is on an overloaded level, the load status information of the transport network layer of the S1 interface that is carried in the resource status update message sent by the DBS to the BS is overload status information, that is, the load status information of the transport network layer of the second S1 interface. For another example, when the transport network layer load of the S1 interface between the RN and the DBS is on a medium level and the transport network layer load of the S1 interface between the DBS and the S-GW is also on a medium level, the load status information of the transport network layer of the S1 interface that is carried in the resource status update message sent by the DBS to the BS is medium load status information, that is, the load status information of the transport network layer of the first S1 interface or the load status information of the transport network layer of the second S1 interface. For still another example, when the transport network layer load of the S1 interface between the RN and the DBS is on an overloaded level but the transport network layer load of the S1 interface between the DBS and the S-GW is on a medium level, the load status information of the transport network layer of the S1 interface that is carried in the resource status update message sent by the DBS to the BS is overload status information, that is, the load status information of the transport network layer of the first S1 interface. Persons skilled in the art may understand that, for the manner of obtaining the load status information of the transport network layer of the first S1 interface or the load status information of the transport network layer of the second S1 interface, reference may be made to the relevant description in S305 in the first embodiment, and no repeated description is given here any further.

In S403, the BS determines a target cell according to the resource status update message. If the determined target cell is a cell of the RN, the BS instructs a UE at the edge of the cell of the BS to hand over to the cell of the RN. For example, the BS may, by adjusting a cell offset (CellIndOffset, CIO for short), make it easier to trigger a measurement report event of the UE and quicken the handover of the UE to the cell of the RN. Persons skilled in the art may understand that, for selecting the RN and handing over the UE, reference may be made to relevant descriptions in the first embodiment, and no repeated description is given here any further.

Therefore, in this embodiment, the UE of the BS can be handed over to the cell of the RN according to a resource load status of the BS, so as to achieve load balance between the cell of the BS and the cell of the RN. In this way, network resource utilization is maximized, and system capacity and system performance are improved.

Figure 5:
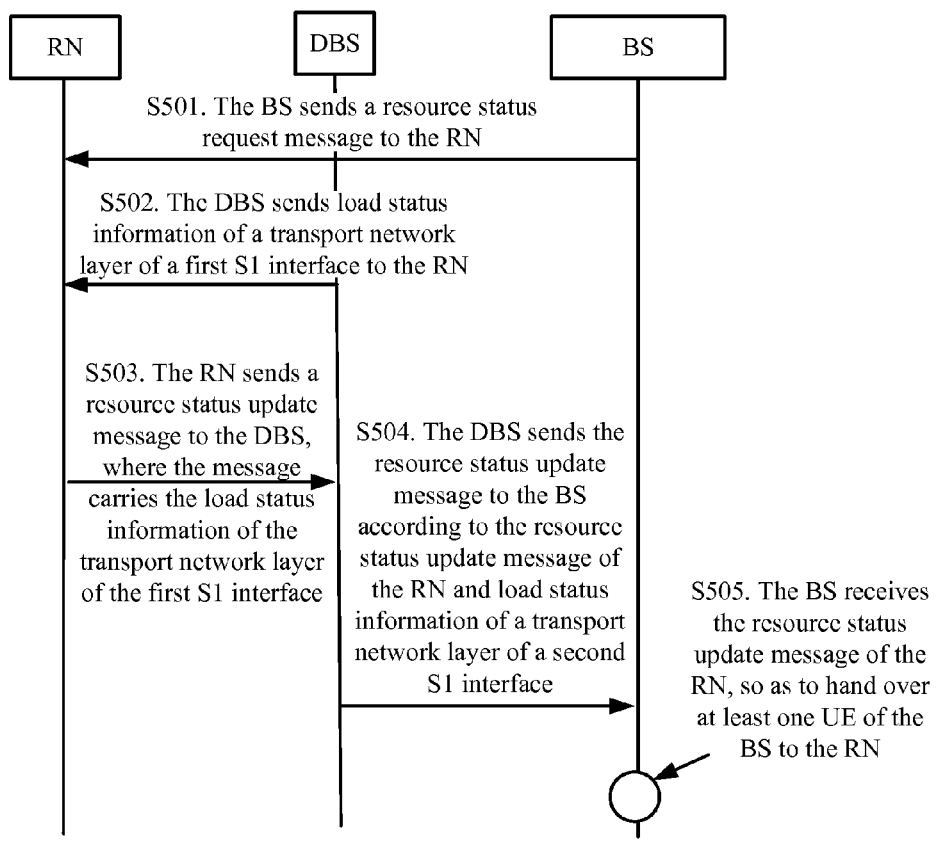
FIG. 5 is a flowchart of a mobility load balance processing method according to a third embodiment of the present invention.

As shown in FIG. 5, a communication method provided in a third embodiment of the present invention includes the following steps:

S501. A BS sends a resource status request message to an RN.

S502. A DBS sends load status information of a transport network layer of a first S1 interface to the RN.

S503. The DBS receives a resource status update message sent by the RN and carries the load status information of the transport network layer of the first S1 interface.

S504. The DBS sends the resource status update message of the RN to the BS according to the resource status update message of the RN and load status information of a transport network layer of a second S1 interface.

S505. The BS receives the resource status update message of the RN, so as to hand over at least one UE of the BS to the RN.

S501 in this embodiment is the same as S401 in the second embodiment, and no repeated description is given here any further.

In S502, when BS resources are excessively loaded, for example, heavy load or overload occurs, the BS sends a resource status request message to the RN through the DBS, so as to hand over the UE of the BS to a cell of the RN. When the resource status request message carries an indication of requesting load status information of a transport network layer of an S1 interface, the RN carries the load status information of the transport network layer of the first S1 interface in the resource status update message, and reports it to the DBS. Because transmission resources between the DBS and the RN are dynamically allocated by the DBS, the RN fails to directly obtain the load status information of the transport network layer of the first S1 interface, and the DBS needs to obtain the load status information of the transport network layer of the first S1 interface and sends it to the RN. The RN receives the load status information of the transport network layer of the first S1 interface, carries it in the resource status update message, and reports it to the BS. In this embodiment, the DBS may use RRC signaling or X2 interface control signaling or S1 interface control signaling to send the load status information of the transport network layer of the first S1 interface to the RN.

In S503, the reporting of RN load status information carried in the resource status update message of the RN depends on the indication of requesting the load status information in the resource status request message of the BS. For example, if the resource status request message carries an indication of requesting hardware load status information, the resource status update message reported by the RN needs to carry the hardware load status information of the RN. Persons skilled in the art may understand that, the indication of requesting the load status information in the resource status request message of the BS may be an indication of requesting radio resource load status information of a cell of the RN or load status information of the transport network layer of the S1 interface of the RN, and no repeated description is given here any further.

In S504 and S505, the DBS sends a load status update message of the RN to the BS according to the load status information of the transport network layer of the first S1 interface and the load status information of the transport network layer of the second S1 interface that are carried in the load status update message of the RN, so that the BS determines whether to hand over the UE of the BS to the cell of the RN. For the step, reference may be made to relevant descriptions in the second embodiment, and no repeated description is given here any further.

Therefore, in this embodiment, the UE of the BS can be handed over to the cell of the RN according to a load status of the BS, so as to achieve load balance between a cell of the BS and the cell of the RN. In this way, network resource utilization is maximized, and system capacity and system performance are improved.

Figure 6:
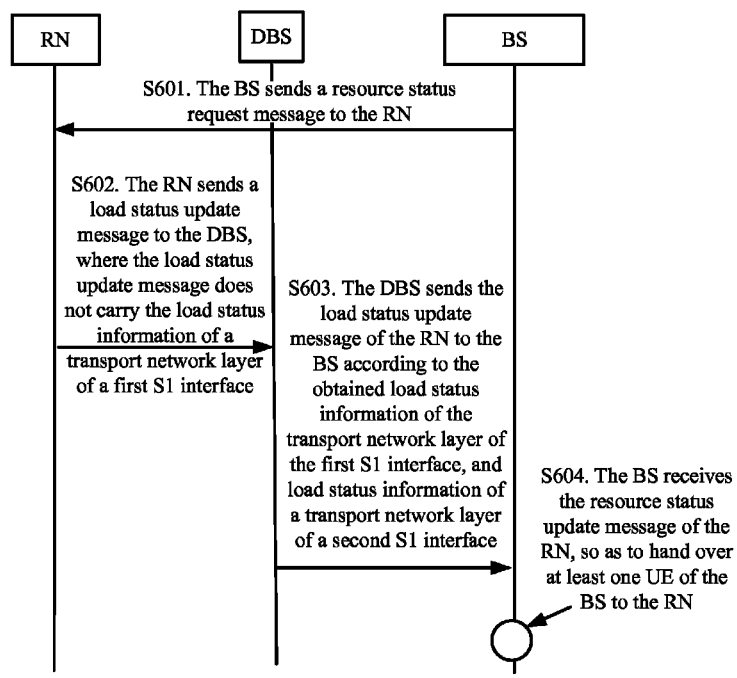
FIG. 6 is a flowchart of a mobility load balance processing method according to a fourth embodiment of the present invention.

As shown in FIG. 6, a communication method provided in a fourth embodiment of the present invention includes the following steps:

S601. A BS sends a resource status request message to an RN.

S602. A DBS receives a load status update message sent by the RN, where the load status update message does not carry load status information of a transport network layer of a first S1 interface.

S603. The DBS sends the load status update message of the RN to the BS according to the obtained load status information of the transport network layer of the first S1 interface and load status information of a transport network layer of a second S1 interface.

S604. The BS receives the load status update message of the RN, so as to hand over a UE of the BS to the RN.

S601 in this embodiment is the same as S401 in the second embodiment, and no repeated description is given here any further.

In S602, when BS resources are excessively loaded, for example, heavy load or overload occurs, the BS sends a resource status request message to the RN through the DBS, so as to hand over the UE of the BS to a cell of the RN. When the resource status request message carries an indication of requesting load status information of a transport network layer of an S1 interface, the DBS may cancel the request indication that is specific to the load status information of the transport network layer of the S1 interface in the resource status request message, and sends the updated resource status request message to the RN. For example, the BS requests the RN to report the load status information of the transport network layer of the S1 interface; and, when the DBS forwards to the RN the resource status request message sent by the BS, the request for reporting an S1 TNL Load Indicator field (the load status information of the transport network layer of the S1 interface) carried in the resource status request message may be cancelled. In this embodiment, the S1 TNL Load Indicator field is an indication of requesting the load status information of the transport network layer of the S1 interface. In this way, when the RN reports its load status information to the DBS, the updated resource status update message reported by the RN carries no S1 TNL Load Indicator field. In other words, the updated resource status update message reported by the RN carries no load status information of the transport network layer of the first S1 interface. The DBS may determine, according to the obtained load status information of the transport network layer of the first S1 interface and in consideration of the load status information of the transport network layer of the second S1 interface, to report the resource status update message of the RN.

In S603 and S604, after receiving the RN load resource update message reported by the RN, the DBS sends the load status update message of the RN to the BS according to the obtained load status information of the transport network layer of the first S1 interface and the load status information of the transport network layer of the second S1 interface, so that the BS determines whether to hand over the UE of the BS to the RN. For the step, reference may be made to relevant descriptions in the second and third embodiments, and no repeated description is given here any further.

Therefore, in this embodiment, the UE of the BS can be handed over to the cell of the RN according to a load status of the BS, so as to achieve load balance between a cell of the BS and the cell of the RN. In this way, network resource utilization is maximized, and system capacity and system performance are improved.

Persons of ordinary skill in the art should understand that, all or part of the steps of the methods in the embodiments may be implemented by a program instructing relevant hardware. The program may be stored in a computer readable storage medium. When the program runs, the above steps of the methods in the embodiments are performed. The storage medium may be any medium capable of storing program codes, such as a ROM, a RAM, a magnetic disk, an optical disk, or the like.

Figure 7:
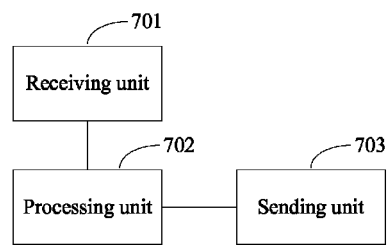
FIG. 7 is a schematic structural diagram of a relay node according to a fifth embodiment of the present invention.

A fifth embodiment of the present invention provides a relay node, whose main structure is shown in FIG. 7, including:

a receiving unit 701, configured to receive indication information sent by a DBS that serves the RN; and a processing unit 702, configured to perform mobility load balance processing according to the indication information to hand over at least one UE in a cell of the RN to a cell of a BS.

The receiving unit 701 is further configured to receive, from the BS, a message for requesting load status information of a transport network layer of an S1 interface, where the message is forwarded by the DBS, and load status information of a transport network layer of a first S1 interface between the DBS and the RN that is sent by the DBS.

The relay node further includes a sending unit 703, configured to send a message that carries the load status information of the transport network layer of the first S1 interface to the DBS.

The sending unit 703 is further configured to send, if the DBS cancels requesting the load status information of the transport network layer of the S1 interface in the message for requesting the load status information of the transport network layer of the S1 interface, a message carrying no load status information of the transport network layer of the first S1 interface to the DBS.

The relay node can perform actions that are performed by the relay node in the mobility load balance processing method in the first to fourth embodiments described above. For example, the receiving unit 701 can perform the actions of S101 in the first embodiment. Therefore, in this embodiment, the UE in the cell of the RN can be handed over to the cell of the BS according to a load status of the DBS, so as to achieve load balance between the cell of the DBS and the cell of the BS. In this way, network resource utilization is maximized, and system capacity and system performance are improved.

Figure 8:
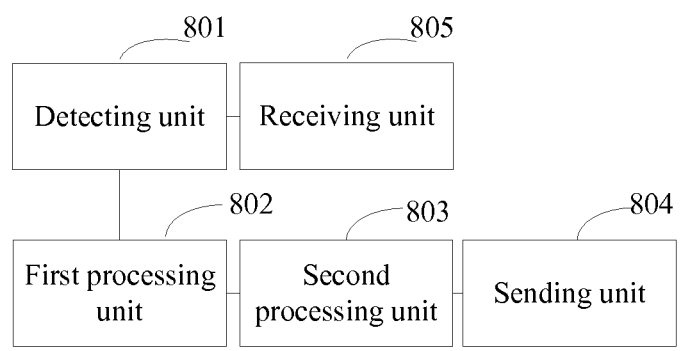
FIG. 8 is a schematic structural diagram of a donor base station according to a sixth embodiment of the present invention.

A sixth embodiment of the present invention provides a donor base station, whose main structure is shown in FIG. 8, including:

a detecting unit 801, configured to detect whether a transport network layer resource of an S1 interface between the donor base station DBS and a relay node RN of the donor base station DBS exceeds a first mobility load balance trigger threshold, or detect whether a hardware resource of the donor base station DBS exceeds a second mobility load balance trigger threshold, or detect whether a transport network layer resource of an S1 interface between the donor base station DBS and a serving gateway SGW exceeds a third mobility load balance trigger threshold, or detect whether a radio resource load of a cell of the donor base station DBS exceeds a fourth mobility load balance trigger threshold; and a first processing unit 802, configured to send indication information to the RN to hand over at least one user equipment UE in a cell of the RN to a cell of a base station BS.

The donor base station further includes a second processing unit 803, configured to send load status information of a transport network layer of the S1 interface to the BS according to load status information of a transport network layer of a first S1 interface between the DBS and the RN and load status information of a transport network layer of a second S1 interface between the DBS and the SGW, so as to hand over a UE in a cell of the BS to a cell of the RN.

The second processing unit 803 is further configured to:

when a transport network layer load value carried in the load status information of the transport network layer of the first S1 interface exceeds a transport network layer load value carried in the load status information of the transport network layer of the second S1 interface, send the load status information of the transport network layer of the first S1 interface to the BS; or when a transport network layer load value carried in the load status information of the transport network layer of the first S1 interface is lower than a transport network layer load value carried in the load status information of the transport network layer of the second S1 interface, send the load status information of the transport network layer of the second S1 interface to the BS; or when a transport network layer load value carried in the load status information of the transport network layer of the first S1 interface is equal to a transport network layer load value carried in the load status information of the transport network layer of the second S1 interface, send the load status information of the transport network layer of the first S1 interface or the load status information of the transport network layer of the second S1 interface to the BS.

The donor base station may further include: a sending unit 804, configured to send the load status information of the transport network layer of the first S1 interface to the RN; and a receiving unit 805, configured to receive a message that is sent by the RN and carries the load status information of the transport network layer of the first S1 interface.

The receiving unit 805 is further configured to receive a message for requesting the load status information of the transport network layer of the S1 interface, where the message is sent by the BS, and the message is a resource status request message.

The receiving unit 805 is further configured to receive a message that is sent by the RN and carries no load status information of the transport network layer of the first S1 interface.

The donor base station can perform actions that are performed by the donor base station in the mobility load balance processing method in the first to fourth embodiments described above. For example, the first processing unit 802 can perform the actions of S602 in the fourth embodiment. Therefore, in this embodiment, the UE in the cell of the BS can be handed over to the cell of the RN according to a load status of the BS, so as to achieve load balance between the cell of the RN and the cell of the BS. In this way, network resource utilization is maximized, and system capacity and system performance are improved.

Figure 9:
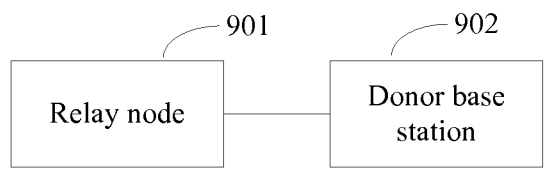
FIG. 9 is a schematic structural diagram of a communication system according to a seventh embodiment of the present invention.

A seventh embodiment of the present invention provides a communication system, whose main structure is shown in FIG. 9, including:

a relay node RN 901, and a donor base station DBS 902, where the donor base station DBS 902 is configured to send indication information to the relay node RN 901; and the relay node RN 901 is configured to perform mobility load balance processing according to the indication information to hand over at least one UE in a cell of the RN to a cell of a base station BS.

The DBS 902 is further configured to detect whether a transport network layer resource of an S1 interface between the DBS and the RN exceeds a first mobility load balance trigger threshold, or detect whether a hardware resource of the DBS exceeds a second mobility load balance trigger threshold, or detect whether a transport network layer resource of an S1 interface between the DBS and a serving gateway SGW exceeds a third mobility load balance trigger threshold, or detect whether a radio resource load of a cell of the DBS exceeds a fourth mobility load balance trigger threshold.

The DBS 902 is further configured to send load status information of a transport network layer of an S1 interface to the BS according to load status information of a transport network layer of a first S1 interface between the DBS 902 and the RN 901 and load status information of a transport network layer of a second S1 interface between the DBS 902 and the serving gateway SGW, so as to hand over at least one UE in a cell of the BS to a cell of the RN 91.

The RN 901 is further configured to receive a message for requesting the load status information of the transport network layer of the S1 interface, where the message is forwarded by the DBS 902, and the load status information of the transport network layer of the first S1 interface that is sent by the DBS 902.

The RN 901 is further configured to send a resource status update message of the RN 901 to the DBS 92.

The communication system includes the DBS and the RN in the first to sixth embodiments, and can perform the actions that are performed by the DBS and the RN in such embodiments. According to a load status of the BS, the UE in the cell of the BS can be handed over to the cell of the RN, or, according to a load status of the DBS, the UE in the cell of the RN can be handed over to the cell of the BS, so as to achieve load balance among the cell of the RN, the cell of the DBS, and the cell of the BS. In this way, network resource utilization is maximized, and system capacity and system performance are improved.

Persons skilled in the art may understand that, the modules in the apparatuses in the embodiments may be arranged in the apparatuses in a distributed manner according to the description of the embodiments, or may be arranged in one or a plurality of apparatuses which are different from those described in the embodiments. In addition, the modules in the embodiments may be combined into one module, or split into multiple submodules.

Persons skilled in the art may understand that, a division of the apparatus and the modules in the embodiments of the present invention is a functional division, and an actual specific structure may be a division or combination of the functional modules.

The sequence numbers of the above embodiments are merely for description, and do not represent the superiority or inferiority of the embodiments.

The solutions specified in the claims also fall within the protection scope of the embodiments of the present invention The foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, as long as these modifications or replacements do not make the essence of corresponding technical solutions depart from the scope of the technical solutions of the embodiments of the present invention.

What is claimed is:

1. A mobility load balance processing method, comprising:
   sending, by a donor base station (DBS) indication information to a relay node (RN) of the DBS, wherein the DBS uses the indication information to instruct the RN to perform mobility load balance processing to hand over at least one user equipment (UE) in a cell of the RN to a neighboring cell served by a base station or a relay station;
   receiving, by the DBS, from the base station or the relay station that serves the neighboring cell, a message for requesting load status information of a transport network layer of an S1 interface; and
   sending, by the DBS, according to load status information of a transport network layer of a first S1 interface between the DBS and the RN, and load status information of a transport network layer of a second S1 interface between the DBS and a serving gateway (SGW), the load status information of the transport network layer of the S1 interface to the base station or the relay station that serves the neighboring cell, so as to hand over at least one UE in the neighboring cell to a cell of the RN;
   wherein the sending, by the DBS, according to the load status information of the transport network layer of the first S1 interface between the DBS and the RN, and the load status information of the transport network layer of the second S1 interface between the DBS and the SGW, the load status information of the transport network layer of the S1 interface to the base station or the relay station that serves the neighboring cell comprises:
   when a transport network layer load value carried in the load status information of the transport network layer of the first S1 interface exceeds a transport network layer load value carried in the load status information of the transport network layer of the second S1 interface, sending, by the DBS, the load status information of the transport network layer of the first S1 interface to the base station or the relay station that serves the neighboring cell; or
   when a transport network layer load value carried in the load status information of the transport network layer of the first S1 interface is lower than a transport network layer load value carried in the load status information of the transport network layer of the second S1 interface, sending, by the DBS, the load status information of the transport network layer of the second S1 interface to the base station or the relay station that serves the neighboring cell; or
   when a transport network layer load value carried in the load status information of the transport network layer of the first S1 interface is equal to a transport network layer load value carried in the load status information of the transport network layer of the second S1 interface, sending, by the DBS, the load status information of the transport network layer of the first S1 interface or the load status information of the transport network layer of the second S1 interface to the base station or the relay station that serves the neighboring cell.

2. The method according to claim 1, wherein the sending the DBS the indication information to the RN of the DBS comprises:
   when the DBS detects that a transport network layer resource of the S1 interface between the DBS and the RN exceeds a first mobility load balance trigger threshold; or
   when the DBS detects that hardware resource thereof exceeds a second mobility load balance trigger threshold; or
   when the DBS detects that a transport network layer resource of an S1 interface between the DBS and a serving gateway, (SGW) exceeds a third mobility load balance trigger threshold; or
   when the DBS detects that a radio resource load of a cell of the DBS exceeds a fourth mobility load balance trigger threshold,
   sending, by the DBS, the indication information to the RN.

3. The method according to claim 1, wherein the message for requesting the load status information of the transport network layer of the S1 interface is a resource status request message.

4. The method according to claim 3, further comprising:
   sending, by the DBS, the resource status request message to the RN, wherein the resource status request message carries a request for the load status information of the transport network layer of the S1 interface;

sending, by the DBS, the load status information of the transport network layer of the first S1 interface to the RN; and receiving, by the DBS, a message that is sent by the RN and carries the load status information of the transport network layer of the first S1 interface.

5. The method according to claim 3, further comprising:

sending, by the DBS, a message that carries no request for obtaining the load status information of the transport network layer of the S1 interface to the RN; and receiving, by the DBS, a message that is sent by the RN and carries no load status information of the transport network layer of the first S1 interface.

6. A donor base station (DBS), comprising:

a processor configured to detect whether a transport network layer resource of an S1 interface between the DBS and a relay node (RN) of the DBS exceeds a first mobility load balance trigger threshold, or detect whether a hardware resource of the DBS exceeds a second mobility load balance trigger threshold, or detect whether a transport network layer resource of an S1 interface between the DBS and a serving gateway (SGW) exceeds a third mobility load balance trigger threshold, or detect whether a radio resource load of a cell of the DBS exceeds a fourth mobility load balance trigger threshold; and a transmitter configured to send indication information to the RN to hand over at least one user equipment (UE) in a cell of the RN to a neighboring cell served by a base station or a relay station;

wherein the transmitter is further configured to send, according to load status information of a transport network layer of a first S1 interface between the DBS, and the RN and load status information of a transport network layer of a second S1 interface between the DBS and the SGW, load status information of the transport network layer of the S1 interface to the base station or the relay station that serves the neighboring cell, so as to hand over at least one UE in the neighboring cell to a cell of the RN.

7. The DBS according to claim 6, wherein the transmitter is further configured to:

when a transport network layer load value carried in the load status information of the transport network layer of the first S1 interface exceeds a transport network layer load value carried in the load status information of the transport network layer of the second S1 interface, send the load status information of the transport network layer of the first S1 interface to the base station or the relay station that serves the neighboring cell; or when a transport network layer load value carried in the load status information of the transport network layer of the first S1 interface is lower than a transport network layer load value carried in the load status information of the transport network layer of the second S1 interface, send the load status information of the transport network layer of the second S1 interface to the base station or the relay station that serves the neighboring cell; or when a transport network layer load value carried in the load status information of the transport network layer of the first S1 interface is equal to a transport network layer load value carried in the load status information of the transport network layer of the second S1 interface, send the load status information of the transport network layer of the first S1 interface or the load status information of the transport network layer of the second S1 interface to the base station or the relay station that serves the neighboring cell.

8. The DBS according to claim 6, wherein the transmitter is further configured to send the load status information of the transport network layer of the first S1 interface to the RN; and the DBS further comprises a receiver which is configured to receive a message that is sent by the RN and carries the load status information of the transport network layer of the first S1 interface.

9. The DBS according to claim 8, wherein:

the receiver is further configured to receive a message for requesting the load status information of the transport network layer of the S1 interface, wherein the message is sent by the base station or the relay station that serves the neighboring cell, and the message is a resource status request message.

10. The DBS according to claim 8, wherein the receiver is further configured to receive a message that is sent by the RN and carries no load status information of the transport network layer of the first S1 interface.

* * * * *